(12) United States Patent
Hirai et al.

(10) Patent No.: US 9,582,884 B2
(45) Date of Patent: Feb. 28, 2017

(54) IMAGE PROCESSOR, TREATMENT SYSTEM, AND IMAGE PROCESSING METHOD FOR DETERMINING A POSITION OF A POINT

(71) Applicant: KABUSHIKI KAISHA TOSHIBA, Minato-ku, Tokyo (JP)

(72) Inventors: Ryusuke Hirai, Tokyo (JP); Yukinobu Sakata, Kanagawa (JP); Yasunori Taguchi, Kanagawa (JP); Takeshi Mita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 212 days.

(21) Appl. No.: 14/476,061

(22) Filed: Sep. 3, 2014

(65) Prior Publication Data

US 2015/0154752 A1 Jun. 4, 2015

(30) Foreign Application Priority Data

Nov. 29, 2013 (JP) .................................. 2013-247662

(51) Int. Cl.
*G06K 9/00* (2006.01)
*G06T 7/00* (2006.01)

(52) U.S. Cl.
CPC .. *G06T 7/0026* (2013.01); *G06T 2207/10116* (2013.01); *G06T 2207/20101* (2013.01); *G06T 2207/30004* (2013.01)

(58) Field of Classification Search
CPC . G06T 2207/10116; G06T 2207/20101; G06T 2207/30004; G06T 7/0026
See application file for complete search history.

(56) References Cited

U.S. PATENT DOCUMENTS 8,073,211 B2 * 12/2011 Halmann ................. A61B 8/00
382/128
2015/0045605 A1 2/2015 Hirai et al.
2015/0154757 A1 6/2015 Sakata et al.

FOREIGN PATENT DOCUMENTS

JP 2011-212130 10/2011
JP 2015-029838 2/2015
JP 2015-104469 6/2015

* cited by examiner

*Primary Examiner* — Nirav G Patel
(74) *Attorney, Agent, or Firm* — Nixon & Vanderhye, P.C.

(57) ABSTRACT

According to an image processor of one embodiment, a first acquirer acquires a first perspective image of a target, which has a first resolution. A second acquirer acquires a second perspective image of the target, which has a second resolution. A first image generator generates first and second display images respectively from the first and second perspective images. The first and third display images have a third resolution lower than at least one of the first and second resolutions. A first point acquirer acquires first and second corresponding points respectively on the first and second display images. A first corrector searches, on the second perspective image, a second image similar to a first image on the first perspective image, the first image including the first corresponding point, and changes, on the second perspective image, a position of the second corresponding point to a position of the second image.

19 Claims, 8 Drawing Sheets

IMAGE PROCESSOR, TREATMENT SYSTEM, AND IMAGE PROCESSING METHOD FOR DETERMINING A POSITION OF A POINT

CROSS-REFERENCE TO RELATED APPLICATION

This application is based upon and claims the benefit of priority from Japanese Patent Application No. 2013-247662, filed Nov. 29, 2013; the entire contents of which are incorporated herein by reference.

FIELD

Embodiments described herein relate generally to an image processor, a treatment system, and an image processing method.

BACKGROUND

For radiotherapy treatments, plans are made based on previously-captured perspective images of a patient so that a focus of a disease in the body of the patient is precisely irradiated. An irradiation direction, an irradiation strength, and the like, are predetermined when a plan is made.

There are positioning apparatuses and methods for aligning a position, at the planning time, of a radiographic referential image of an object to be irradiated, to a position of the object at the time of actual irradiation. Conventionally, there is technology of displaying a guideline based on the epipolar geometry when a positioning process is performed. However, it is difficult to precisely designate, using a display image with low resolution, positions of points to be used for the positioning process.

DETAILED DESCRIPTION

According to one embodiment, an image processor may include, but is not limited to, a first acquirer, a second acquirer, a first image generator, a first point acquirer, and a first corrector. The first acquirer acquires a first perspective image of a target viewed at a first time. The first perspective image has a first resolution. The second acquirer acquires a second perspective image of the target viewed at a second time different from the first time. The second perspective image has a second resolution. The first image generator generates first and second display images from the first and second perspective images respectively. The first and second display images have a third resolution lower than at least one of the first and second resolutions. The first point acquirer acquires a first designated point on the first display image and a first corresponding point on the second display image. The first corrector searches, on the second perspective image, a second image similar to a first image on the first perspective image. The first image includes the first corresponding point. The first corrector corrects the position of the first corresponding point on the second perspective image to a position on the second perspective image, which corresponds to the position of the designated point on the first perspective image.

According to another embodiment, a treatment system includes, but is not limited to, an image processor, a radiographic imaging apparatus, a display apparatus, an operation device, and a treatment apparatus. The image processor includes, but is not limited to, a first acquirer, a second acquirer, a first image generator, a first point acquirer, and a first corrector. The first acquirer acquires a first perspective image of a target viewed at a first time. The first perspective image has a first resolution. The second acquirer acquires a second perspective image of the target viewed at a second time different from the first time. The second perspective image has a second resolution. The first image generator generates first and second display images respectively from the first and second perspective images. The first and second display images have a third resolution lower than at least one of the first and second resolutions. The first point acquirer acquires first and second corresponding points respectively on the first and second display images. The first corrector searches, on the second perspective image, a second image similar to a first image on the first perspective image. The first image includes the first corresponding point. The first corrector corrects, on the second perspective image, a position of the second corresponding point to a position of the second image. The radiographic imaging apparatus captures the second perspective image. The display apparatus displays the first and second display images at the third resolution. The operation device inputs the first and second corresponding points to the first point acquirer. The treatment apparatus performs a treatment on the target based on the changed position of the second corresponding point.

According to another embodiment, an image processing method includes, but is not limited to, the following processes. A first perspective image of a target viewed at a first time is captured. The first perspective image has a first resolution. A second perspective image of the target viewed at a second time different from the first time is captured. The second perspective image has a second resolution. First and second display images are generated respectively from the first and second perspective images. The first and second display images have a third resolution lower than at least one of the first and second resolutions. First and second corresponding points respectively on the first and second display images are captured. A second image similar to a first image on the first perspective image is searched on the second perspective image. The first image includes the first corresponding point. A position of the second corresponding point is changed, on the second perspective image, to a position of the second image.

In some embodiments, the first corrector searches the second image within a first region of the second perspective image, the first region including the second corresponding point, and the first corrector corrects the position of the corresponding point on the second perspective image to a position on the second perspective image. The corresponding point corresponds to the position of the designated point on the first perspective image.

In some embodiments, the first point acquirer acquires the first designated point updated or the first corresponding point updated.

In some embodiments, the first image generator generates first and second comparison images from the first and second perspective images respectively, the first and second comparison images having a fourth resolution higher than the third resolution.

In some embodiments, the third acquirer acquires a third perspective image of the target viewed at a third time in a direction different from a direction in which the first perspective image is viewed, and the third perspective image having a fourth resolution. The a fourth acquirer acquires a fourth perspective image of the target viewed at a fourth time in a direction different from a direction in which the second perspective image is viewed, the fourth time being different from the third time, the fourth direction being, and the fourth perspective image having a fifth resolution. The second image generator generates third and fourth display images from the third and fourth perspective images respectively, the third and fourth display images having the third resolution. The second point acquirer acquires a second designated point on the third display image and a second corresponding point on the fourth display image. The second corrector searches, on the fourth perspective image, a fourth image similar to a third image on the third perspective image, the third image including the third designated point, and the second corrector correcting the position of the second corresponding point on the fourth perspective image to a position on the fourth perspective image. The second corresponding point corresponds to the position of the designated point on the third perspective image.

In some embodiments, the second corrector corrects the position of the second corresponding point based on an epipolar line.

In some embodiments, the first acquirer acquires any one of voxel data and the first perspective image reconstructed from the voxel data.

Various embodiments will be described hereinafter with reference to the accompanying drawings.

(First Embodiment)

Figure 1:
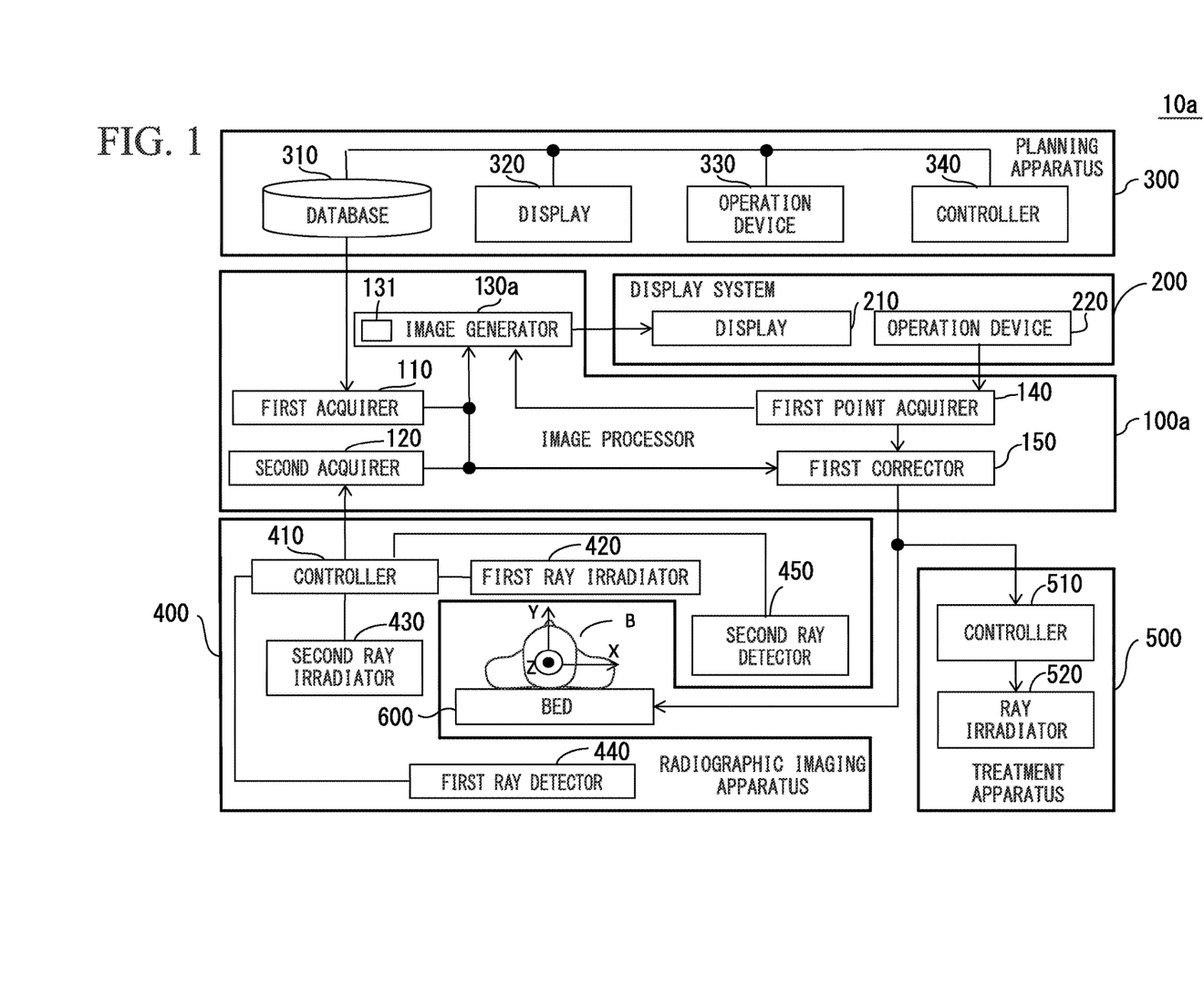
FIG. 1 is a block diagram illustrating an example of a treatment system according to a first embodiment.

A first embodiment will be described in detail with reference to drawings. FIG. 1 is a block diagram illustrating an example of a configuration of a treatment system 10a. The treatment system 10a may include, but is not limited to, a radiographic imaging apparatus 400, an image processor 100a, and a display system 200. The treatment system 10a may further include, but is not limited to, a planning apparatus 300, a treatment apparatus 500, and a bed 600.

The planning apparatus 300 makes a treatment plan based on an input received through operations by a user or operator (such as a surgeon or a medical doctor), and images of the inside of a target B (such as a patient) to be subject to a radiotherapy, a proton therapy, a particle radiotherapy, or the like. Images are captured using a radiographic imaging apparatus configured to capture a perspective image of the inside of the target B. Such a radiographic imaging apparatus may be, but is not limited to, an X-ray apparatus, a computed tomography (CT) apparatus, a magnetic resonance imaging (MRI) apparatus, a positron emission tomography (PET) apparatus, a single photon emission computed tomography (SPECT) apparatus, or the like.

The planning apparatus 300 may include, but is not limited to, a database 310, a display 320, an operation device 330, and a controller 340.

The database 310 stores image data acquired at the time a plan is made. Acquired images may be either two-dimensional or three-dimensional. Image data is data acquired by quantifying, per pixel, a state of the inside of the target B to be treated. The image data may be data based on signals received from an X-ray apparatus, a CT apparatus, an MRI apparatus, a PET apparatus, or a SPECT apparatus.

Data stored in the database 310 may be voxel data of an acquired image of the target B. Data stored in the database 310 may also be voxel data as raw data acquired by subjecting projected data to a correction process, such as logarithmic conversion, offset correction, sensitivity correction, beam hardening correction, or scattered radiation correction. Data stored in the database 310 may also be two-dimensional image data reconstructed from the voxel data. Descriptions will be given in the present embodiment with respect to a case where the database 310 stores voxel data.

Descriptions will be given in the present embodiment with respect to a case where images captured by an X-ray CT apparatus at the time a treatment plan is made (hereinafter, "planning time") are used.

The display 320 displays a first perspective image at the planning time under the control of the controller 340. The first perspective image is an image of the target B viewed in a first direction at the planning time. The display 320 also displays a third perspective image at the planning time under the control of the controller 340. The third perspective image is an image of the target B viewed at the planning time in a third direction different from the first direction. For example, the first and third perspective images are images reconstructed from the voxel data stored in the database 310, that is, digitally reconstructed radiographs (DRR). When there are multiple perspective images each including both negative and positive images, it is preferable to display, under control of the controller 340, images that are inverted so that each image includes either a negative or positive image.

The operation device 330 receives an input through operations by a user. The operation device 330 supplies the controller 340 with a signal in accordance with the received input.

The controller 340 controls each unit included in the planning apparatus 300 based on the signal received from the operation device 330. The controller 340 may be, but is not limited to, a central processing unit (CPU).

The radiographic imaging apparatus 400 captures a perspective image of the inside of the target 13 at the time of treatment. The radiographic imaging apparatus 400 may be, but is not limited to, an X-ray apparatus, a CT apparatus, an MRI apparatus, and the like. Hereinafter, there will be described a case where the radiographic imaging apparatus 400 is an X-ray imaging apparatus. The radiographic imaging apparatus 400 may include, but is not limited to, a controller 410, and first and second image captures. The first image capture includes a first ray irradiator 420 and a first ray detector 440. The second image capture includes a second ray irradiator 430 and a second ray detector 450.

Figure 2:
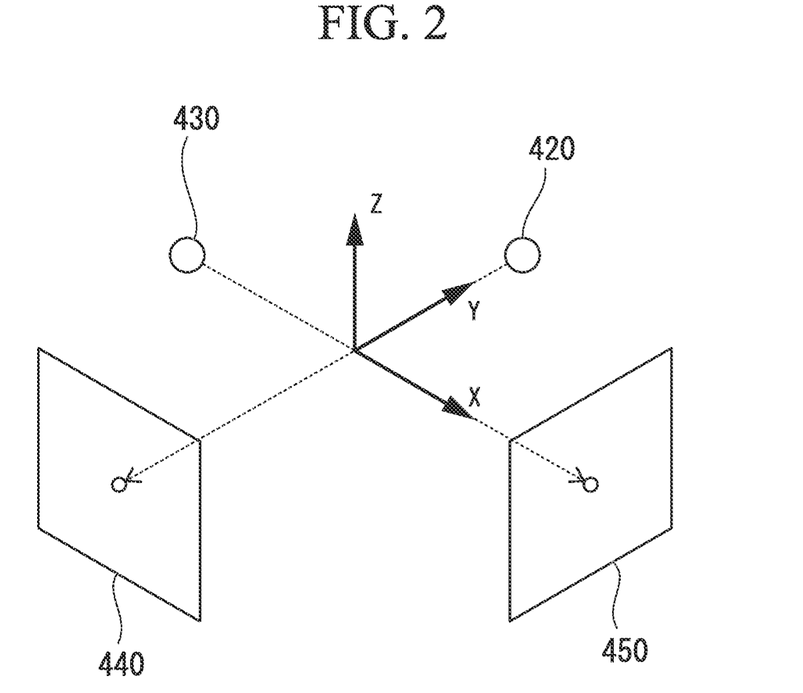
FIG. 2 is a diagram illustrating a positional relationship of a radiographic imaging apparatus according to the first embodiment.

FIG. 2 is a diagram illustrating a positional relationship of the radiographic imaging apparatus 400. The first ray detector 440 may include, but is not limited to, a first flat panel detector (FPD). The first FPD of the first ray detector 440 receives the X-ray projected from the first ray detector 440 and converts the detected X-ray into a digital signal. Based on the digital signal converted by the first FPD, the first ray detector 440 generates a second perspective image of the target 13. The second perspective image is a perspective image of the target B viewed at the time of treatment in a second direction that is substantially the same as the first direction in which the first perspective image is viewed. The second perspective image may be, but is not limited to, an image captured by a radiographic imaging apparatus 400 (X-ray apparatus), that is, an X-ray radiograph (XR). Here, the second perspective image may be a two-dimensional perspective image reconstructed from voxel data by simulation where positions of x-ray irradiators and projection planes are virtually determined.

The second ray detector 450 may include, but is not limited to, a second FPD. The second FPD of the second ray detector 450 receives an X-ray projected from the second ray detector 450 and converts the detected X-ray into a digital signal. Based on the digital signal converted by the second FPD, the second ray detector 450 generates a fourth perspective image of the target B. The fourth perspective image is a perspective image of the target B viewed at the time of treatment in a fourth direction that is substantially the same as the third direction in which the third perspective image is viewed.

The first ray detector 440 is disposed so as to be paired with the first ray irradiator 420, thereby enabling the first FPD of the first ray detector 440 to receive an X-ray irradiated from the first ray irradiator 420. The second ray detector 450 is disposed so as to be paired with the second ray irradiator 430, thereby enabling the second FPD of the second ray detector 450 to receive an X-ray irradiated from the second ray irradiator 430.

Figure 7:
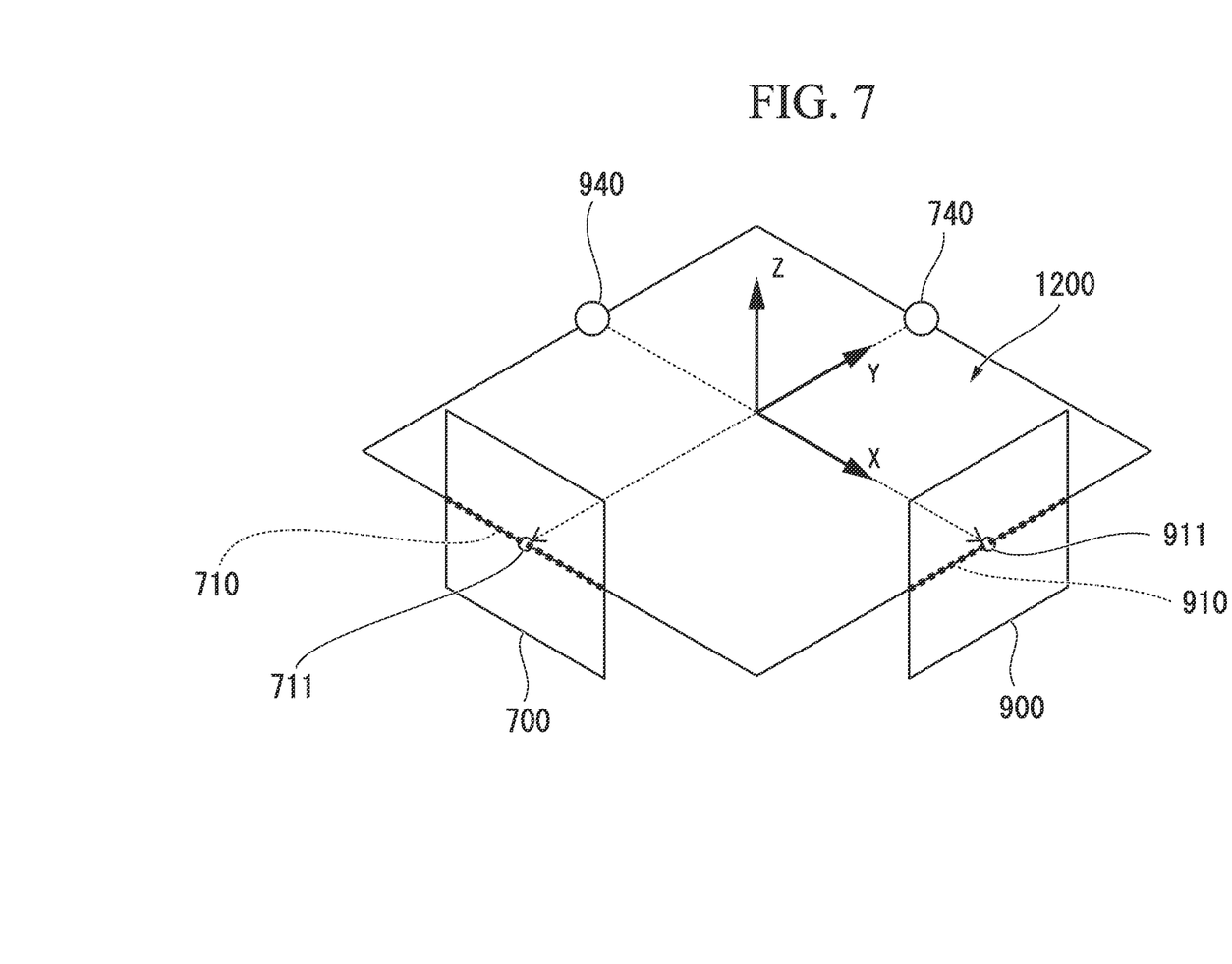
FIG. 7 is a diagram illustrating an epipolar line according to the second embodiment.

Configuration and functions of the radiographic imaging apparatus 400 are described here using a three-dimensional coordinate system, such as an XYZ coordinate system shown in FIGS. 2 and 7. The first and second ray detectors 440 and 450 of the radiographic imaging apparatus 400 are subject to calibration in order to obtain a perspective projection matrix used for coordinate transformation to the XYZ coordinate system. Specifically, the first ray detector 440 is disposed in a negative direction of a Y-axis in the XYZ coordinate system. The second ray detector 450 is disposed in a positive direction of an X-axis in the XYZ coordinate system. The first ray irradiator 420 is disposed in a positive direction of the Y-axis in the XYZ coordinate system. The first ray irradiator 420 irradiates an X-ray toward the first ray detector 440. The second ray irradiator 430 is disposed in a negative direction of the X-axis in the XYZ coordinate system. The second ray irradiator 430 irradiates an X-ray toward the second ray detector 450.

Although the case where the first and second ray detectors 440 and 450 are disposed so as to be orthogonal to each other has been described in the present embodiment, a configuration of the present embodiment is not limited thereto. To perform a three-dimensional positioning process, however, it is preferable that the first and second ray detectors 440 and 450 are disposed so as not to be parallel to each other.

The X-ray output from the first ray irradiator 420 penetrates the target B and reaches the first ray detector 440. The second perspective image is generated using the energy of the X-ray reaching the first ray detector 440. On the other hand, the X-ray output from the second ray irradiator 430 penetrates the target B and reaches the second ray detector 450. The fourth perspective image is generated using the energy of the X-ray reaching the second ray detector 450.

The controller 410 controls each unit of the radiographic imaging apparatus 400. The controller 410 may be, but is not limited to, a central processing unit (CPU). The controller 410 acquires the second perspective image with a second resolution from the first ray detector 440. The controller 410 supplies the second perspective image with the second resolution to the image processor 100a.

The image processor 100a generates a first display image with a predetermined display resolution from the first perspective image. The image processor 100a also generates a second image with the predetermined display resolution from the second perspective image. Further, the image processor 100a corrects, on the second perspective image, a position of a first corresponding point. Here, the image processor 100a may correct, on the first perspective image, a position of a first designated point. The details of the image processor 100a will be described later.

The display system 200 displays, at the time of treatment, display images generated by the image processor 100a. The display system 200 may include, but is not limited to, a display 210 and an operation device 220. The display 210 receives image data from the image processor 100a. The image data may be, but is not limited to, data indicating the first display image generated from the first perspective image. The image data may be, but is not limited to, data indicating the second display image generated from the second perspective image.

The display 210 displays the first and second display images at the predetermined display resolution. The display 210 may be, but is not limited to, a liquid crystal display panel, an organic EL panel, a plasma display panel, or a cathode ray tube (CRT). The predetermined display resolution may be a resolution of the image generated by the image processor 100a or a resolution preciously designated via the operation device 220.

The operation device 220 is an input apparatus that receives an input through operations by the user and supplies the image processor 100a with a signal in accordance with the received input. The operation device 220 may receive an input through operations performed to input to the image processor 100a, information indicating a position on the image displayed on the display 210. The information indicating the position on the image may be expressed as a coordinate. The operation device 220 is not limited to a specific device as long as a user can input information indicating a position. The operation device 220 may include, but is not limited to, a touch panel, a keyboard, a mouse, and the like. A user operates the operation device 220 to designate a position on a display image to the precision of the display resolution, thereby inputting information indicating the designated position to the image processor 100a. For example, when the operation device 220 is a mouse, the user moves, using the mouse, a cursor to a position on an image and performs clicking, thereby designating the position on the image.

The operation device 220 and the display 210 may be integrated. In this case, the user touches the operation device 220 displayed on the display 210 to designate a position on a display image to the precision of the display resolution, thereby inputting information indicating the designated position to the image processor 100a.

Figure 3:
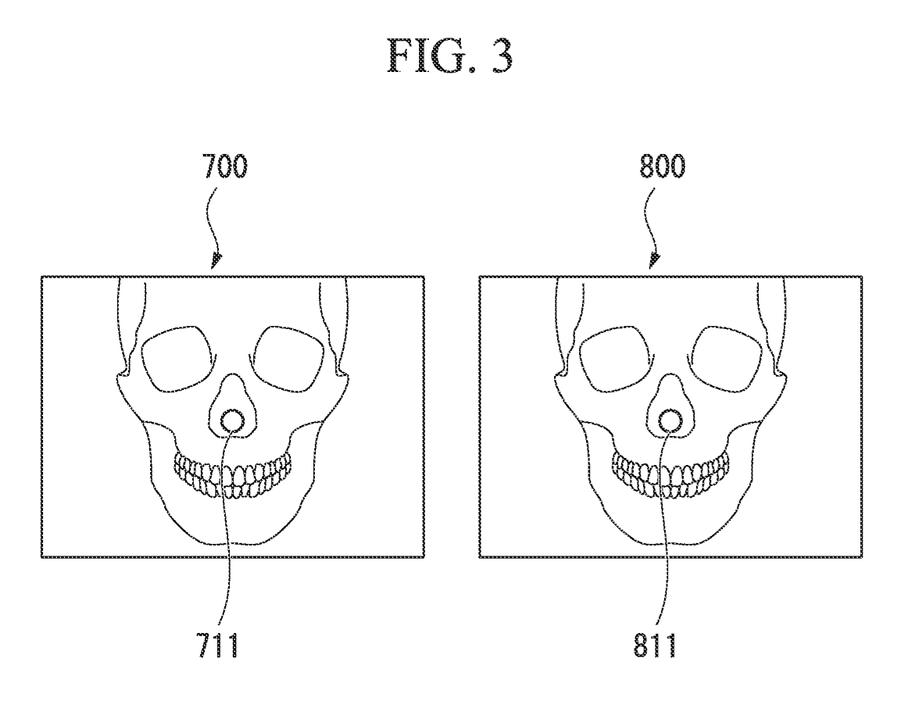
FIG. 3 is a diagram illustrating first and second display images according to the first embodiment.

FIG. 3 is a diagram illustrating the first and second display images. The display 210 displays, at the predetermined display resolution, a first display image 700 and a second display image 800 in a line, which are generated by the image processor 100a. The first display image 700 is an image generated from the first perspective image. The perspective image of the target B viewed in the first direction is shown on the first display image 700. The perspective image of the target B viewed in the second direction that is substantially the same as the first direction is displayed on the second display image 800. For example, the first and second directions are the negative direction of the Y axis shown in FIG. 2.

To determine the position of a patient, a user (such as a surgeon) manually designates, based on visual determination by the user, corresponding points on an X-ray radiographic image and an X-ray referential image. In other words, the user manually selects corresponding points. For this reason, the designated corresponding points on the X-ray radiographic image and the X-ray referential image do not always indicate anatomically the same position. Thus, there is a difference in position between the corresponding points designated on the X-ray radiographic image and the X-ray referential image.

A position of a first designated point 711 on the first display image 700 is designated to a precision of the display resolution by the user operating the operation device 220. The operation device 220 supplies the image processor 100*a* with first information indicating the position of the first designated point 711 to the precision of the display resolution. Additionally, a position of a first corresponding point 811 on the second display image 800, which is anatomically the same position as that of the first designated point 711, is designated to the precision of the display resolution by the user operating the operation device 220. The operation device 220 supplies the image processor 100*a* with second information indicating the position of the first corresponding point 811.

The display 210 may superimpose on the first display image 700, an image representing the position of the first designated point 711. The image representing the position of the first designated point 711 may be, but is not limited to, a circle. The display 210 may superimpose on the second display image 800, an image representing the position of the first corresponding point 811. The image representing the position of the first corresponding point 811 may be, but is not limited to, a circle. The display 210 may display information indicating the position of the first designated point 711 and information indicating the position of the first corresponding point 811.

The position of the first designated point 711 may be updated on the first display image 700. Similarly, the position of the first corresponding point 811 may be updated on the second display image 800. When the operation device 220 is a mouse, for example, the user moves, using the mouse, a cursor to the position of the first designated point 711 on the first display image 700 or the first corresponding point 811 on the second display image 800, and drags the first designated point 711 or the first corresponding point 811, thus updating the position of the first designated point 711 or the first corresponding point 811. When the operation device 220 is a keyboard, for example, the user presses an arrow key on the keyboard to select the first designated point 711 or the first corresponding point 811, thereby updating the position of the first designated point 711 or the first corresponding point 811.

Here, the first information indicating the position of the first designated point 711 and the second information indicating the position of the first corresponding point 811 may be received from another database and be supplied to a first point acquirer 140.

The treatment apparatus 500 is an apparatus to be used for subjecting the target B to radiotherapy, proton therapy, or particle radiotherapy on the target B at the time of treatment. The treatment apparatus 500 may include, but is not limited to, a controller 510 and a ray irradiator 520. The controller 510 controls each unit of the treatment apparatus 500. The controller 510 may be, but is not limited to, a central processing unit. The controller 510 receives a positioning signal from the image processor 100*a*. Based on the positioning signal, the controller 510 controls the ray irradiator 520. The ray irradiator 520, under control of the controller 510, irradiates radio beams, proton beams, or particle beams toward the target B positioned by the bed 600.

The bed 600 receives the positioning signal from the image processor 100*a*. Based on the positioning signal, the bed 600 moves the target B within a predetermined region while keeping the target B lying. Thus, the radio beams, proton beams, or particle beams are precisely irradiated from the ray irradiator 520 to a precisely-determined point in the inside of the target B.

Next, the details of the image processor 100*a* are described here.

The image processor 100*a* may include, but is not limited to, a first acquirer 110, a second acquirer 120, an image generator 130*a*, and a first point acquirer 140, and a first corrector 150.

The first acquirer 110 acquires from the planning apparatus 300, the first perspective image of the target 13 with the first resolution which is acquired at a first time. The first acquirer 110 may acquire from the database 310 of the planning apparatus 300, voxel data representing the first perspective image of the target B. The first acquirer 110 supplies the image generator 130*a* with image data representing the first perspective image.

The second acquirer 120 acquires from the controller 410 of the radiographic imaging apparatus 400, the second perspective image of the target B with the second resolution which is acquired at a second time different from the first time. The second acquirer 120 supplies the second perspective image to the image generator 130*a* and the first corrector 150.

The image generator 130*a* may include, but is not limited to, a first image generator 131. The first image generator 131 generates a display image with a predetermined display resolution. The predetermined display resolution is assumed to be smaller than at least one of the first and second resolutions. The predetermined display resolution may be selected from resolutions available to the display 210 or predetermined by a user. Hereinafter, it is assumed that a value of a resolution δ becomes smaller as the resolution becomes higher.

The first image generator 131 receives the first perspective image with the first resolution from the first acquirer 110. The first image generator 131 supplies the first perspective image to the first corrector 150. Here, the first image generator 131 may receive the voxel data from the first acquirer 110. In this case, the first image generator 131 reconstructs the first perspective image from the voxel data.

The first image generator 131 generates the first display image 700 with the display resolution (see FIG. 3) from the first perspective image. The first display image 700 is generated by resizing the first perspective image. Resizing means changing the number of pixels of an image. Here, methods for the first image generator 131 to generate the first display image 700 may include, but is not limited to, nearest neighbor, bi-linear interpolation, cubic convolution, and the like. The first image generator 131 resizes the first perspective image "$\delta_{disp}/\delta_1$" times, thus generating the first display image 700. "$\delta_{disp}$" represents the display resolution. "$\delta_1$" represents the first resolution. The first image generator 131 supplies the generated first display image 700 to the display 210 of the display system 200.

The first image generator 131 receives the second perspective image with the second resolution from the second acquirer 120. The first image generator 131 generates the second display image 800 with the display resolution from the second perspective image. The second display image 800 is generated by resizing the second perspective image. Here, methods for the first image generator 131 to generate the second display image 800 may include, but is not limited to, nearest neighbor, bi-linear interpolation, cubic convolution, and the like. The first image generator 131 resizes the second perspective image "$\delta_{disp}/\delta_2$" times, thus generating the second display image 800. "$\delta_{disp}$" represents the display resolution. "$\delta_2$" represents the second resolution. The first image generator 131 supplies the generated second display image 800 to the display 210 of the display system 200.

The first image generator 131 receives from the first point acquirer 140, first information indicating the position of the first designated point 711 to the precision of the display resolution. The first image generator 131 may superimpose on the first display image 700, an image representing the position of the first designated point 711. The first image generator 131 receives from the first point acquirer 140, second information indicating the position of the first corresponding point 811 to the precision of the display resolution. The first image generator 131 may superimpose on the second display image 800, an image representing the position of the first corresponding point 811.

The first point acquirer 140 acquires from the operation device 220 to the precision of the display resolution, the first information indicating the position of the first designated point 711 designated on the first display image 700. The first point acquirer 140 supplies the first information indicating the position of the first designated point 711 to the first image generator 131. The first point acquirer 140 acquires from the operation device 220 to the precision of the display resolution, the second information indicating the position of the first corresponding point 811 on the second display image 800. The first corresponding point 811 on the second display image 800 corresponds to the first designated point 711 on the first display image 700. The first point acquirer 140 supplies the second information indicating the position of first corresponding point 811 to the first image generator 131.

The first corrector 150 searches on the second perspective image, a second image similar to a first image on the first perspective image. The first image includes the position of the first designated point 711. Here, the first corrector 150 may search on the second perspective image, a second image similar to a referential image on the first perspective image. The referential image has a referential area including the position of the first designated point 711.

The first corrector 150 corrects on the second perspective image, the position of the first corresponding point 811 to the position of the second image. Here, the first corrector 150 corrects the position of the first corresponding point 811 on the second perspective image, based on the second information indicating the position of the first corresponding point 811 to the precision of the display resolution, and a similarity between the first and second perspective images.

When the second resolution is higher than the first resolution, the first corrector 150 may use a method such as nearest neighbor, bi-linear interpolation, or cubic convolution, in order that a resolution per pixel of the first perspective image with the first resolution becomes the same as the second resolution. The first corrector 150 resizes the first perspective image "$\delta_1/\delta_2$" times. Hereinafter, the first perspective image resized "$\delta_1/\delta_2$" times is referred to as a "first enlarged image".

Based on pixel values of the referential image on the first enlarged image, the referential image having the referential area and having a center at the first designated point 711, the first corrector 150 searches, within a searching area defined on the second perspective image, an image with the highest similarity to the referential image on the first enlarged image. In other words, the first corrector 150 corrects, on the second perspective image, the position of the first corresponding point 811 with reference to values of pixels around the first designated point 711 on the first enlarged image. The similarity may be, but is not limited to, a similarity using normalized mutual correlation, or a similarity using other image characteristic amounts. When image characteristic amounts are expressed by vectors, a similarity becomes higher as the distance between vectors becomes smaller.

The searching area may be, but is not limited to, an inner region of a rectangular with a side having the length "$\delta_{disp}/2$". The rectangular has a center at the first corresponding point 811 on the second perspective image. The rectangular may be, but is not limited to, a square or the like. The searching area may be, but is not limited to, an inner region of a circle with a radius of "$\delta_{disp}/2$". The circle has a center at the first corresponding point 811 on the second perspective image.

When the position of the first corresponding point 811 is updated on the second display image 800, the first corrector 150 may correct the position of the updated first corresponding point 811. Similarly, when the first resolution is higher than the second resolution, the first corrector 150 may correct the position of the first corresponding point 811 on the second perspective image, based on a correlation between the first and second perspective images.

Additionally, the first corrector 150 may correct the position of the first corresponding point 811 based on a comparison resolution $\delta_{comp}$ such that "display resolution $\delta_{disp} > \delta_{comp} > \min(\delta_1, \delta_2)$". Here, "min(A, B)" denotes a function that compares values of A and B and outputs a smaller one of the values. The comparison resolution $\delta_{comp}$ may be designated by a user. As described above, a value of the resolution $\delta$ becomes smaller as the resolution becomes higher.

The first corrector 150 generates first and second comparison images. The first comparison image is generated by resizing the first perspective image "$\delta_1/\delta_{comp}$" times. The second comparison image is generated by resizing the second perspective image "$\delta_2/\delta_{comp}$" times. Based on pixel values of a referential image on the first comparison image, the referential image having a referential area and having the center at the first designated point 711, the first corrector 150 searches, within a searching area defined on the second comparison image, an image with the highest similarity to the referential image on the first comparison image. In other words, the first corrector 150 corrects, on the second comparison image, the position of the first corresponding point 811 with reference to values of pixels around the first designated point 711 on the first comparison image. Similarly, when the first resolution is higher than the second resolution, the first corrector 150 may correct the position of the first corresponding point 811, based on a correlation between the first and second perspective images.

Here, the image processor 100a may correct the position of the first designated point 711 on the first perspective image based on the first information indicating the position of the first designated point 711 to the precision of the display resolution and the similarity between the first and second perspective images. Additionally, when the position of the first designated point 711 is updated, the first corrector 150 may similarly correct, on the first perspective image, the updated position of the first designated point 711.

Figure 4:
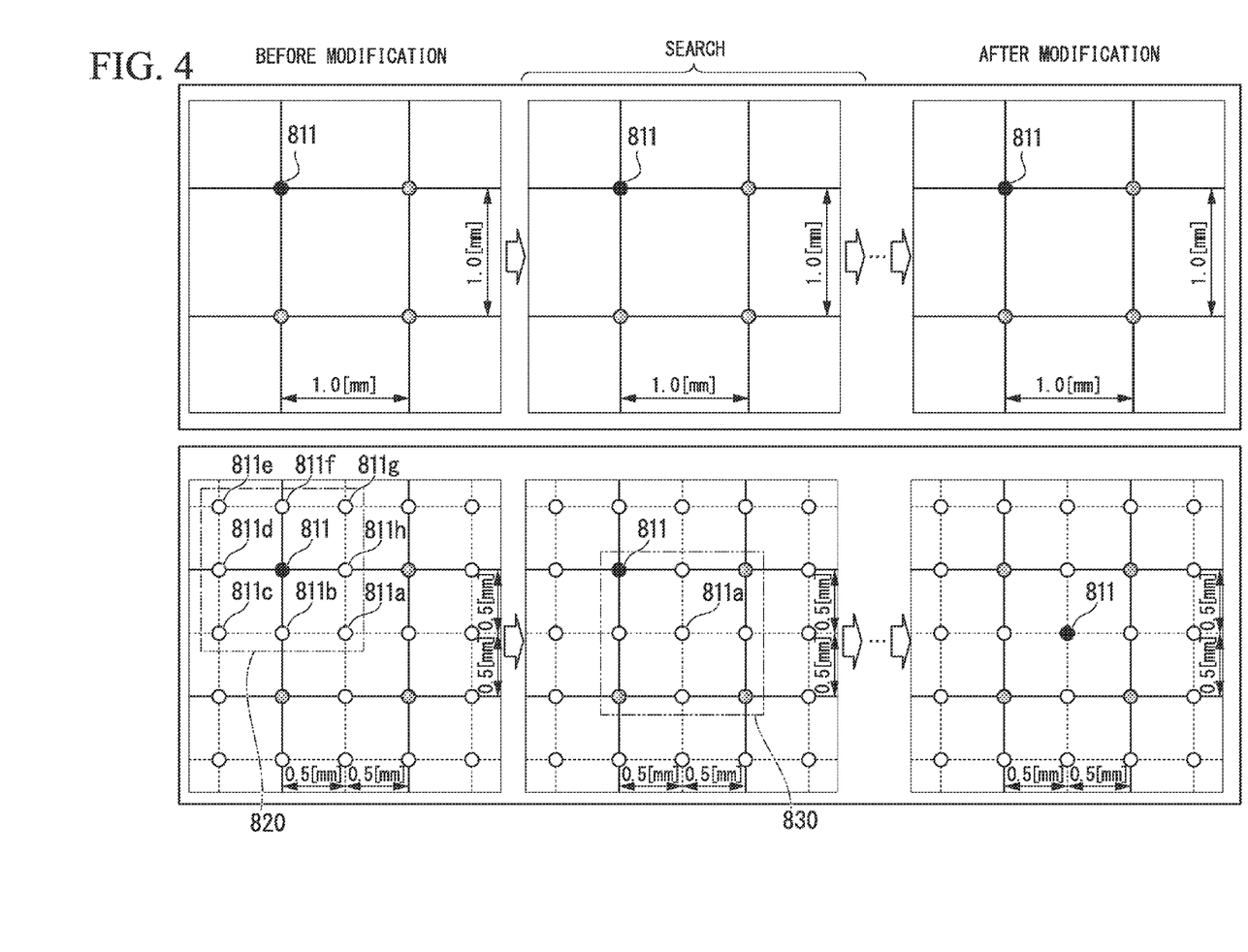
FIG. 4 is a diagram illustrating a method of correcting a position of a corresponding point according to the first embodiment.

FIG. 4 is a diagram illustrating a method of correcting the position of the corresponding point 811. The upper left of FIG. 4 illustrates a partial region of the second display image 800 before the position of the first corresponding point 811 is modified. The upper center of FIG. 4 illustrates the partial region of the second display image 800 to be used to search a similar image. The upper right of FIG. 4 illustrates the partial region of the second display image 800 after the position of the first corresponding point 811 is modified. The "partial region of the second display image 800" shown in the upper side of FIG. 4 includes the first corresponding point 811. It is assumed in FIG. 4 that the display resolution $\delta$ of the second display image 800 is 1.0 [mm], as an example.

The lower side of FIG. 4 is associated with the upper side of FIG. 4. In other words, the lower left of FIG. 4 illustrates a partial region of the second perspective image before the position of the first corresponding point 811 is modified. The lower center of FIG. 4 illustrates the partial region of the second perspective image to be used to search a similar image. The lower right of FIG. 4 illustrates the partial region of the second perspective image after the position of the first corresponding point 811 is modified. It is assumed in FIG. 4 that the second resolution $\delta$ of the second perspective image is 0.5 [mm], as an example. The "partial region of the second perspective image" shown in the lower side of FIG. 4 indicates the same region as that of the "partial region of the second display image 800" shown in the upper side of FIG. 4. For this reason, the "partial region of the second perspective image" shown in the lower side of FIG. 4 also includes the first corresponding point 811.

The display resolution of the second display image 800 shown in the upper side of FIG. 4 is lower than the second resolution of the second perspective image shown in the lower side of FIG. 4. For this reason, even when the position of the image representing the position of the first corresponding point 811 is modified on the second perspective image shown in the lower side of FIG. 4, the position of the image representing the first corresponding point 811 occasionally seems to be unchanged on the second display image 800 because of its lower display resolution.

Here, the image shown in the lower side of FIG. 4 may be the second comparison image generated by resizing the second perspective image "$\delta_2/\delta_{comp}$" times. Additionally, when the first resolution is higher than the second resolution, the image shown in the lower side of FIG. 4 may be the second comparison image generated by resizing the second perspective image "$\delta_2/\delta_1$" times.

The searching area may include multiple unit searching areas. A center point group 820 including the first corresponding point 811 at the center is defined in the partial region of the second perspective image before the position of the first corresponding point 811 is modified. The center point group 820 is a group of center points of unit searching areas. The length of one side of the area of the center point group 820 may be predetermined by the user. It is assumed in FIG. 4 that the length of one side of the area of the center point group 820 is 1.0 [min], as an example. The center point group 820 includes the first corresponding point 811 and searching center points 811a to 811h.

A unit searching area 830 may be, but is not limited to, a rectangular window (such as a square window) with a center at the searching center point 811a included in the center point group 820. The rectangular window has a side having the length in accordance with the display resolution (such as 1.0 mm). Alternatively, the unit searching area 830 may be a circular window with a center at the searching center point 811a included in the center point group 820. The circular window has a radius in accordance with the display resolution (such as 1.0 mm). With respect to the first corresponding point 811 and the searching center points 811b to 811h, unit searching areas can be defined similarly.

The first corrector 150 searches, within the unit searching area 830, an image similar to the referential image on the first perspective image which has the referential area including the first designated point 711. The first corrector 150 also searches, within another unit searching area with a center at the searching center point 811b, an image similar to the referential image on the first perspective image which has the referential area including the first designated point 711.

Similarly, the first corrector 150 searches, within another unit searching area with a center at the first corresponding point 811, an image similar to the referential image on the first perspective image which has the referential area including the first designated point 711. With respect to the searching center points 811c to 811h, the first corrector 150 similarly searches, within a unit searching area with a center at one of the searching center points 811c to 811h, an image similar to the referential image on the first perspective image which has the referential area including the first designated point 711.

The partial region of the second perspective image after the position of the first corresponding point 811 is modified is shown in the lower side of FIG. 4. As shown, the first corrector 150 corrects the position of the first corresponding point 811 to the position of the searching center point 811a. Thus, the precision of the position of the first corresponding point 811 is enhanced by a sub-pixel precision of the display resolution, that is, "$\sqrt{2} \times 0.5$ [mm]", compared to the precision thereof before the modification.

Next, procedure for the processing of the image processor 100a is described here.

Figure 5:
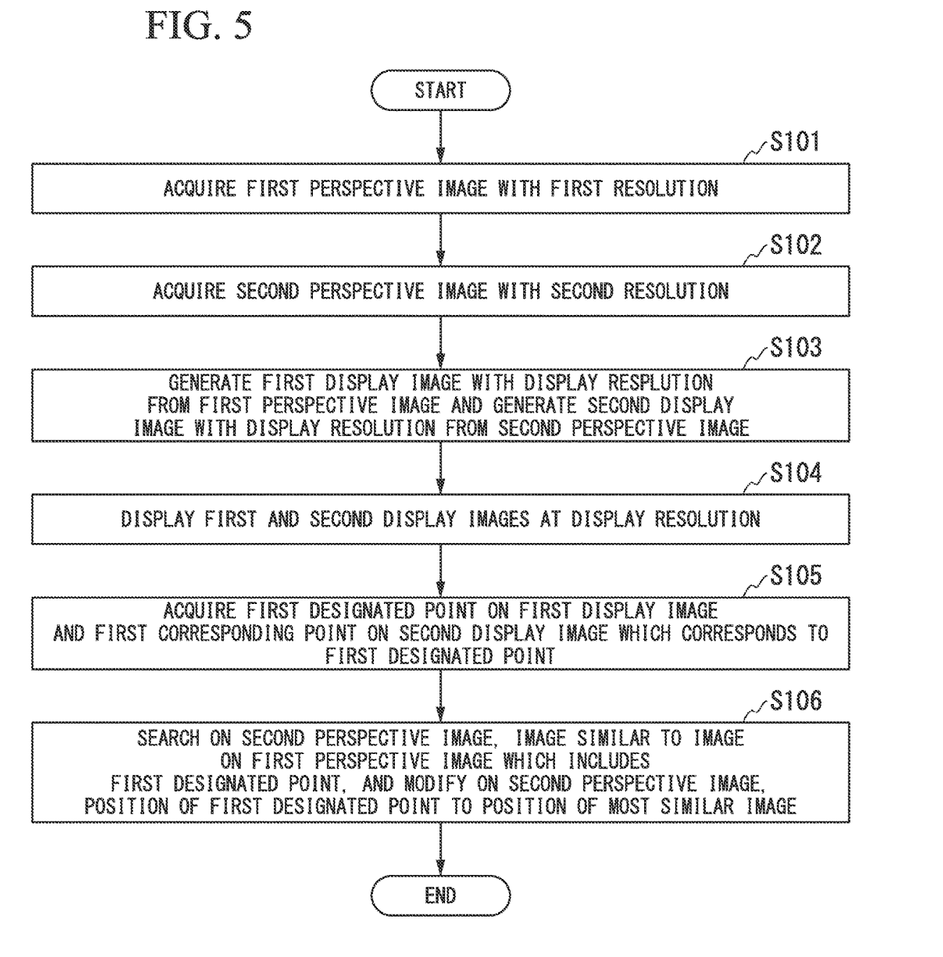
FIG. 5 is a flowchart illustrating processes performed by an image processor according to the first embodiment.

FIG. 5 is a flowchart illustrating an example of processes performed by the image processor 100a.

(Step S101) The first acquirer 110 acquires from the planning apparatus 300, the first perspective image of the target B with the first resolution which is acquired at a first time.

(Step S102) The second acquirer 120 acquires from the radiographic imaging apparatus 400, the second perspective image of the target B with the second resolution which is acquired at a second time different from the first time.

(Step S103) The first image generator 131 generates, from the first perspective image, the first display image 700 with the display resolution that is smaller than at least one of the first and second resolutions. The first image generator 131 generates the second display image 800 with the display resolution from the second perspective image.

(Step S104) The first image generator 131 renders the display 210 display the first display image 700 and the second display image 800 at the display resolution.

(Step S105) The first point acquirer 140 acquires the first information indicating the position of the first designated point 711 designated on the first display image 700. The first point acquirer 140 acquires the second information indicating the position of the first corresponding point 811 on the second display image 800. The first corresponding point 811 on the second display image 800 corresponds to the first designated point 711 on the first display image 700.

(Step S106) The first corrector 150 searches on the second perspective image, the second image similar to the first image on the first perspective image, the first image including the first designated point 711. The first corrector 150 corrects, on the second perspective image, the position of the first corresponding point 811 to the position of the second image on the second perspective image.

(Second Embodiment)

A second embodiment will be described with reference to drawings. The second embodiment differs from the first embodiment in a configuration of the image processor. Therefore, only the difference between the first and second embodiments will be described hereinafter.

Figure 6:
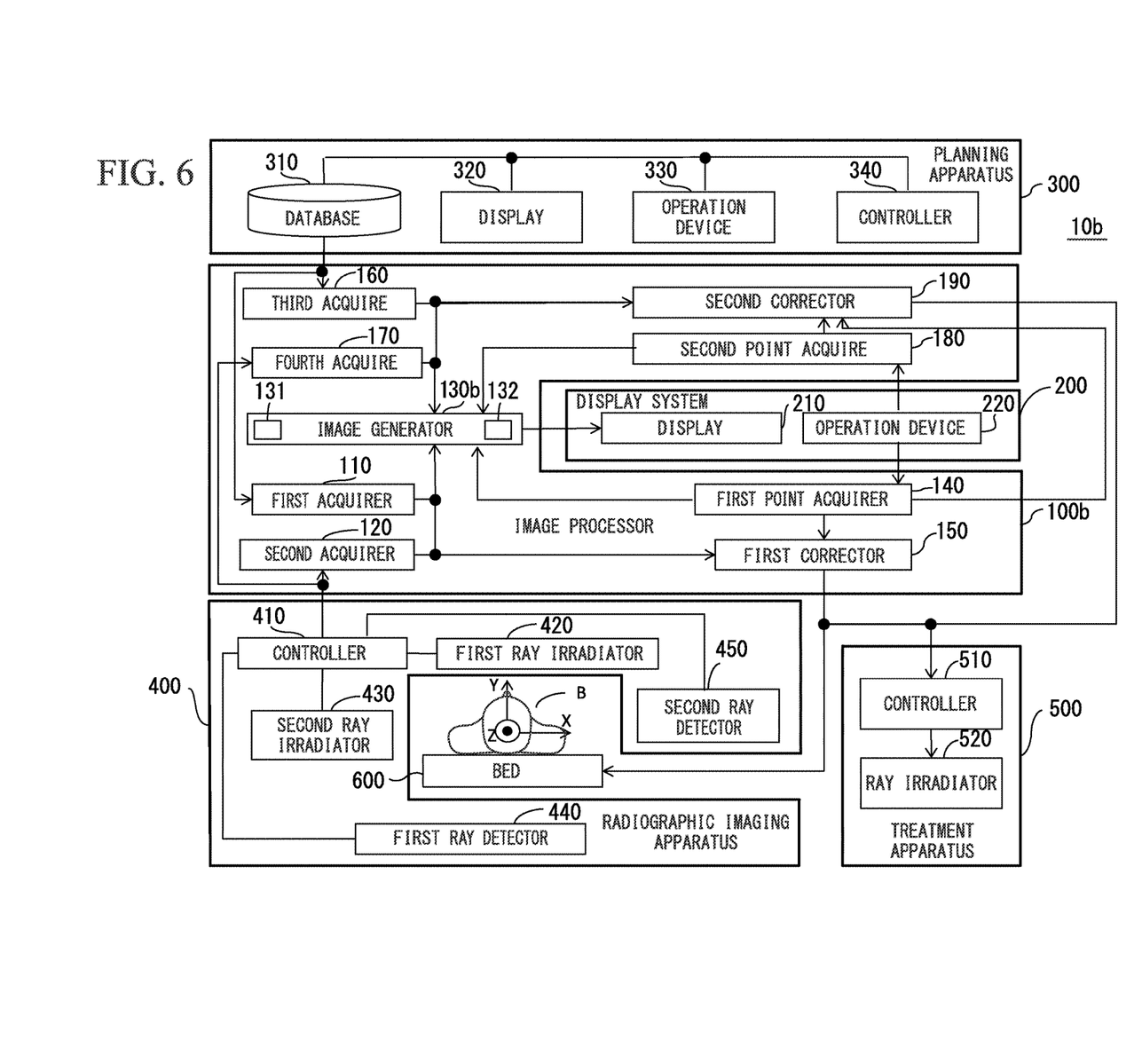
FIG. 6 is a block diagram illustrating an example of a treatment system according to a second embodiment.

FIG. 6 is a block diagram illustrating an example of a treatment system 10*b*. The treatment system 10*b* may include, but is not limited to, the radiographic imaging apparatus 400, an image processor 100*b*, and the display system 200. The treatment system 10*b* may further include, but is not limited to, the planning apparatus 300, the treatment apparatus 500, and the bed 600.

The controller 410 of the radiographic imaging apparatus 400 captures a fourth perspective image with a fourth resolution from the second ray detector 450. The controller 410 supplies the fourth perspective image with the fourth resolution to the image processor 100*b*.

The image processor 100*b* generates a first display image 700 with a predetermined display resolution from the first perspective image. The image processor 100*b* also generates a second display image 800 with the predetermined display resolution from the second perspective image. The image processor 100*b* also generates a third display image 900 with the predetermined display resolution from the third perspective image. The image processor 100*b* also generates a fourth display image 1000 with the predetermined display resolution from the fourth perspective image.

FIG. 7 is a diagram illustrating an epipolar line. To explain the epipolar line, the first display image 700 is virtually disposed in the negative direction of the Y axis in the XYZ coordinate system, as shown in FIG. 7. The third display image 900 is virtually disposed in the positive direction of the X axis in the XYZ coordinate system. A third ray irradiator 740 is virtually disposed in the positive direction of the Y axis in the XYZ coordinate system. A fourth ray irradiator 940 is virtually disposed in the negative direction of the X axis in the XYZ coordinate system.

An epipolar line is obtained based on epipolar constraint. An epipolar plane 1200 is a plane including three points that are the third ray irradiator 740, the fourth ray irradiator 940, and the first designated point 711. An epipolar line 710 is defined as a straight line of intersection of the first display image 700 and the epipolar plane 1200. In other words, the epipolar line 710 is a line passing the first designated point 711. An epipolar line 910 is defined as a straight line of intersection of the third display image 900 and the epipolar plane 1200. In other words, the epipolar line 910 is a line passing a second designated point 911.

Figure 8:
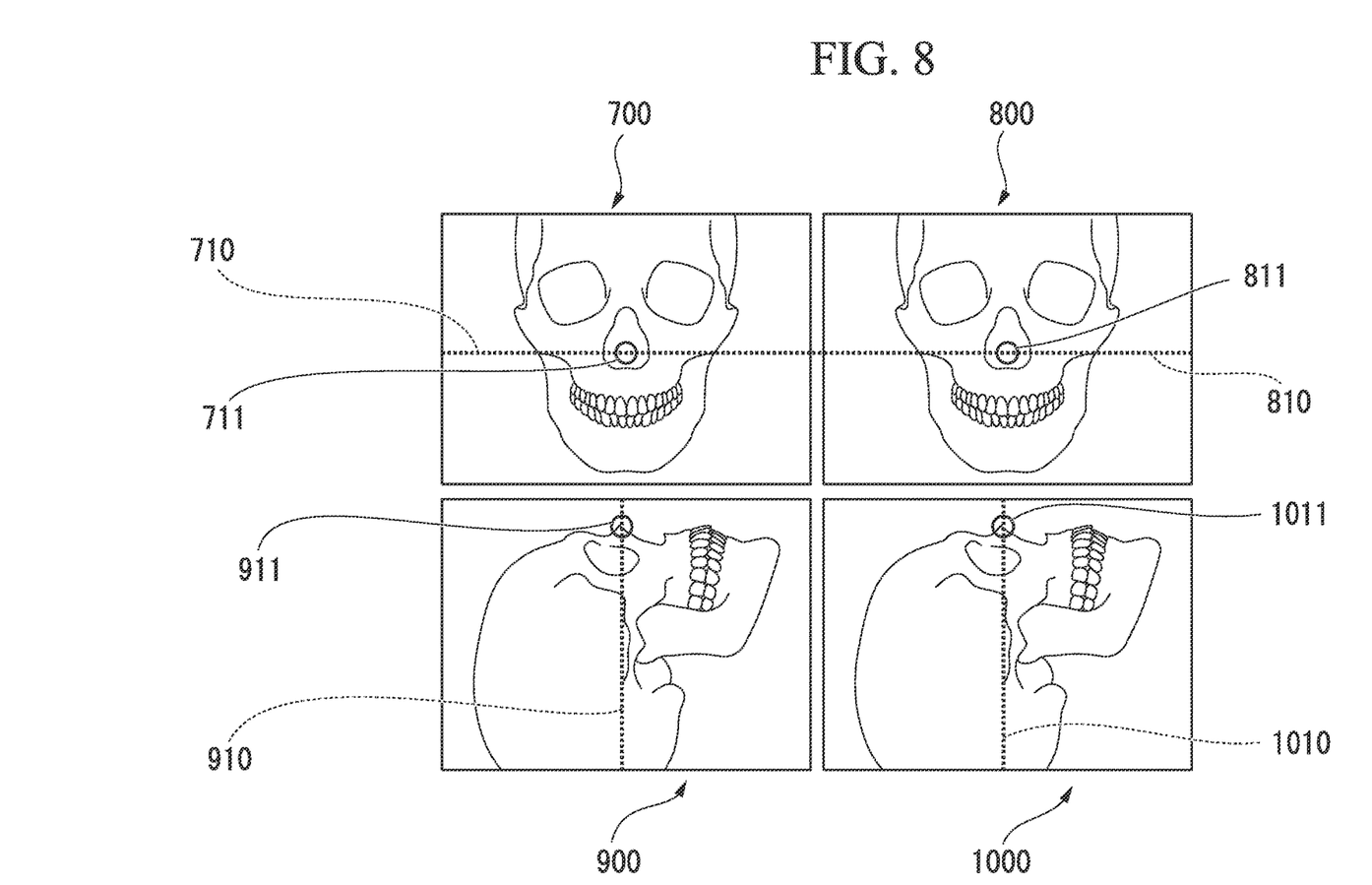
FIG. 8 is a diagram illustrating a method of displaying first to fourth display images according to the second embodiment.

FIG. 8 is a diagram illustrating a method of displaying the first to fourth display images 700, 800, 900, and 1000. The display 210 displays at the predetermined display resolution, the first to fourth display images 700, 800, 900, and 1000 in a line. The third display image 900 is an image generated from the third perspective image. The fourth display image 1000 is an image generated from the fourth perspective image.

The display 210 may superimpose on the first display image 700, an image representing the position of the epipolar line 710 on the first display image 700. The image representing the position of the epipolar line 710 may be, but is not limited to, a dashed line. The display 210 may superimpose on the second display image 800, an image representing the position of an epipolar line 810 on the second display image 800.

The position of the second designated point 911 is defined on the third display image 900 to a precision of the display resolution by a user operating the operation device 220. The operation device 220 supplies the image processor 100*b* with information indicating the position of the second designated point 911 to the precision of the display resolution. Additionally, the position of a second corresponding point 1011 that corresponds to the second designated point 911 is defined on the third display image 900 to the precision of the display resolution by the user operating the operation device 220. The position of the second corresponding point 1011 and the position of the second designated point 911 indicate anatomically the same position of a focus of a disease. The operation device 220 supplies the image processor 100*b* with information indicating the position of the second corresponding point 1011 to the precision of the display resolution.

The display 210 may superimpose on the third display image 900, an image representing the position of the second designated point 911. The display 210 may superimpose on the fourth display image 1000, an image representing the position of the second corresponding point 1011. The display 210 may display information (coordinate) indicating the position of the second designated point 911 and information (coordinate) indicating the position of the second corresponding point 1011.

The position of the second designated point 911 may be updated on the third display image 900. Similarly, the position of the second corresponding point 1011 may be updated on the fourth display image 1000. When the operation device 220 is a mouse, for example, the user moves, using the mouse, a cursor to the position of the second designated point 911 or the second corresponding point 1011, and drags the second designated point 911 or the second corresponding point 1011, thus updating the position of the second designated point 911 or the second corresponding point 1011. When the operation device 220 is a keyboard, for example, the user presses an arrow key on the keyboard to select the second designated point 911 or the second corresponding point 1011, thereby updating the position of the second designated point 911 or the second corresponding point 1011.

The second designated point 911 is designated on the third display image 900 by the user so as to indicate the same three-dimensional position as indicated by the first designated point 711. On the third display image 900 (third perspective image), the second designated point 911 is on the epipolar line 910 under the epipolar constraint. In other words, the second designated point 911 is on the epipolar line 910 calculated based on the first designated point 711.

The second corresponding point 1011 is designated on the fourth display image 1000 by the user so as to indicate the same three-dimensional position as indicated by the first corresponding point 811. On the fourth display image 1000 (fourth perspective image), the second corresponding point 1011 is on the epipolar line 1010 under the epipolar constraint. In other words, the second corresponding point 1011 is on the epipolar line 1010 calculated based on the first corresponding point 811.

Referring back to FIG. 6, the example of the configuration of the treatment system 10*b* is further described here.

The image processor 100*b* corrects, on the second perspective image, the position of the first corresponding point 811. Additionally, the image processor 100*b* may correct, on the first perspective image, the position of the first designated point 711. Further, the image processor 100*b* may correct, on the fourth perspective image, the position of the second corresponding point 1011. Moreover, the image processor 100*b* may correct, on the third perspective image, the position of the second designated point 911.

The image processor 100*b* may include, but is not limited to, the first acquirer 110, the second acquirer 120, an image generator 130*b*, the first point acquirer 140, the first corrector 150, a third acquirer 160, a fourth acquirer 170, a second point acquirer 180, and a second corrector 190. The image generator 130*b* of the second embodiment correspond to the image generator 130*a* of the first embodiment.

The third acquirer 160 acquires from the planning apparatus 300, a third perspective image of the target 13 with a third resolution which is acquired at a third time. The third acquirer 160 may acquire from the database 310 of the planning apparatus 300, voxel data indicating the third perspective image of the target B. The third acquirer 160 supplies the image generator 130*b* with image data indicating the third perspective image.

The fourth acquirer 170 acquires from the controller 410 of the radiographic imaging apparatus 400, a fourth perspective image of the target B with a fourth resolution which is acquired at a fourth time different from the third time. The fourth acquirer 170 supplies the fourth perspective image to the image generator 130*b* and the second corrector 190.

The image generator 130*b* may include, but is not limited to, the first image generator 131 and a second image generator 132. The second image generator 132 generates a display image with a predetermined display resolution. The predetermined display resolution is assumed to be smaller than at least one of the third and fourth resolutions. The predetermined display resolution may be selected from resolutions available to the display 210 of the display system 200 or predetermined by the user.

The second image generator 132 receives the third perspective image with the third resolution from the third acquirer 160. The second image generator 132 supplies the third perspective image to the second corrector 190. Here, the second image generator 132 may receive the voxel data from the third acquirer 160. In this case, the second image generator 132 reconstructs the third perspective image from the voxel data.

The second image generator 132 generates the third display image 900 with the display resolution from the third perspective image. The third display image 900 is generated by resizing the third perspective image. Here, methods for the second image generator 132 to generate the third display image 900 may include, but is not limited to, nearest neighbor, hi-linear interpolation, cubic convolution, and the like. The second image generator 132 resizes the third perspective image "$\delta_{disp}/\delta_3$" times, thus generating the third display image 900. "$\delta_{disp}$" represents the display resolution. "$\delta_3$" represents the third resolution. The second image generator 132 supplies the generated third display image 900 to the display 210 of the display system 200.

The second image generator 132 receives the fourth perspective image with the fourth resolution from the fourth acquirer 170. The second image generator 132 generates the fourth display image 1000 with the display resolution from the fourth perspective image. The fourth display image 1000 is generated by resizing the fourth perspective image. Here, methods for the second image generator 132 to generate the fourth display image 1000 may include, but is not limited to, nearest neighbor, bi-linear interpolation, cubic convolution, and the like. The second image generator 132 resizes the fourth perspective image "$\delta_{disp}/\delta_4$" times, thus generating the fourth display image 1000. "$\delta_{disp}$" represents the display resolution. "$\delta_4$" represents the fourth resolution. The second image generator 132 supplies the generated fourth display image 1000 to the display 210 of the display system 200.

The second image generator 132 receives from the second point acquirer 180, third information indicating a position of the second designated point 911 to the precision of the display resolution. The second image generator 132 may superimpose on the third display image 900, an image representing the position of the second designated point 911. The second image generator 132 may calculate the epipolar line 910 based on the position of the first designated point 711 and superimpose on the third display image 900, an image representing the epipolar line 910.

The second image generator 132 receives from the second point acquirer 180, fourth information indicating a position of the second corresponding point 1011 to the precision of the display resolution. The second image generator 132 may superimpose on the fourth display image 1000, an image representing the position of the second corresponding point 1011. The second image generator 132 may calculate the epipolar line 1010 based on the position of the first corresponding point 811 and superimpose on the fourth display image 1000, an image representing the epipolar line 1010.

The second point acquirer 180 acquires from the operation device 220 to the precision of the display resolution, the third information indicating the position of the second designated point 911 designated on the third display image 900. The second point acquirer 180 supplies the third information indicating the position of the second designated point 911 to the second image generator 132. The second point acquirer 180 acquires from the operation device 220 to the precision of the display resolution, the fourth information indicating the position of the second corresponding point 1011 on the fourth display image 1000. The second corresponding point 1011 on the fourth display image 1000 corresponds to the second designated point 911 on the fourth display image 1000. The second point acquirer 180 supplies the second image generator 132 with the fourth information indicating the position of second corresponding point 1011 to the precision of the display resolution.

The second corrector 190 receives the third perspective image from the third acquirer 160 via the second image generator 132. The second corrector 190 receives the fourth perspective image from the fourth acquirer 170. The second corrector 190 receives from the first point acquirer 140, the first information indicating the position of the first designated point 711 to the precision of the display resolution. The second corrector 190 receives from the first point acquirer 140, the second information indicating the position of the first corresponding point 811 to the precision of the display resolution. The second corrector 190 receives from the second point acquirer 180, the third information indicating the position of the second designated point 911 to the precision of the display resolution. The second corrector 190 receives from the second point acquirer 180, the fourth information indicating the position of the second corresponding point 1011 to the precision of the display resolution.

Here, the first information indicating the position of the first designated point 711 and the second information indicating the position of the first corresponding point 811 may be received from another database and be supplied to the first point acquirer 140, instead of being received through operations by the user. The third information indicating the position of the second designated point 911 and the fourth information indicating the position of the second corresponding point 1011 may be received from another database and be supplied to the second point acquirer 190, instead of being received through operations by the user.

The second corrector 190 searches on the fourth perspective image, a fourth image similar to a third image on the third perspective image. The third image includes the second designated point 911. Here, the second corrector 190 may search on the fourth perspective image, a fourth image similar to a referential image on the third perspective image. The referential image has a referential area including the second designated point 911. Additionally, the second corrector 190 may search, within a searching area including the epipolar line 1010 on the fourth perspective image, a fourth image similar to the referential image on the third perspective image. The referential image has a referential area including the second designated point 911.

The second corrector 190 corrects on the fourth perspective image, the position of the second corresponding point 1011 to the position of the fourth image on the fourth perspective image. Here, the second corrector 190 corrects the position of the second corresponding point 1011 on the fourth perspective image, based on the fourth information indicating the position of the second corresponding point 1011 to the precision of the display resolution, and a similarity between the third and fourth perspective images.

When the fourth resolution is higher than the third resolution, the second corrector 190 may use a method such as nearest neighbor, bi-linear interpolation, or cubic convolution, in order that a resolution per pixel of the third perspective image with the third resolution becomes the same as the fourth resolution. The second corrector 190 resizes the third perspective image "$\delta_3/\delta_4$" times. Hereinafter, the third perspective image resized "$\delta_3/\delta_4$" times is referred to as a "third enlarged image".

Based on pixel values of the referential image on the third enlarged image, the referential image having the referential area and having a center at the second designated point 911, the second corrector 190 searches, within a searching area defined on the fourth perspective image, an image with the highest similarity to the referential image on the third enlarged image. In other words, the second corrector 190 corrects, on the fourth perspective image, the position of the second corresponding point 1011 with reference to values of pixels around the second designated point 911 on the third enlarged image. The similarity may be, but is not limited to, a similarity using normalized mutual correlation, or a similarity using other image characteristic amounts. When image characteristic amounts are expressed by vectors, a similarity becomes higher as the distance between vectors becomes smaller.

The searching area may be, but is not limited to, a segment on the epipolar line 1010 calculated based on the first corresponding point 811. The segment is within an inner region of a rectangular with a side having the length "$\delta_{disp}/2$". The rectangular has a center at the second corresponding point 1011 on the fourth perspective image. The searching area may be, but is not limited to, a segment on the epipolar line 1010 calculated based on the first corresponding point 811. The segment is within an inner region of a circle with a radius of "$\delta_{disp}/2$". The circle has a center at the second corresponding point 1011 on the fourth perspective image.

When the position of the second corresponding point 1011 is updated on the fourth display image 1000, the second corrector 190 may move the position of the updated second corresponding point 1011 to a position on the epipolar line 1010 calculated based on the first corresponding point 811, thus correcting the position of the updated second corresponding point 1011 in a similar manner. Additionally, even when the third resolution is higher than the fourth resolution, the second corrector 190 may similarly correct the position of the second corresponding point 1011 on the fourth perspective image, based on a correlation between the third and fourth perspective images.

Additionally, the second corrector 190 may correct the position of the second corresponding point 1011 based on a comparison resolution $\delta_{comp}$ such that "display resolution $\delta_{disp} > \delta_{comp} > \min(\delta_3, \delta_4)$". Here, "min(A, B)" denotes a function that compares values of A and B and outputs a smaller one of the values. The comparison resolution $\delta_{comp}$ may be designated by a user. As described above, a value of the resolution $\delta$ becomes smaller as the resolution becomes higher.

The second corrector 190 generates third and fourth comparison images. The third comparison image is generated by resizing the third perspective image "$\delta_3/\delta_{comp}$" times. The fourth comparison image is generated by resizing the fourth perspective image "$\delta_4/\delta_{comp}$" times. Based on pixel values of a referential image on the third comparison image, which has a referential area and has the center at the second designated point 911, the second corrector 190 search, within a searching area defined on the fourth comparison image, an image with the highest similarity to the referential image on the third comparison image. In other words, the second corrector 190 corrects, on the fourth comparison image, the position of the second corresponding point 1011 with reference to values of pixels around the second designated point 911 on the third comparison image. Similarly, when the third resolution is higher than the fourth resolution, the second corrector 190 may correct the position of the second corresponding point 1011, based on a correlation between the third and fourth perspective images.

Here, the image processor 100*b* may correct the position of the second designated point 911 on the third perspective image based on the third information indicating the position of the second designated point 911 to the precision of the display resolution and the similarity between the third and fourth perspective images. Additionally, when the position of the second designated point 911 is updated, the second corrector 190 may move the updated position of the second designated point 911 to a position on the epipolar line 910 calculated based on the first designated point 711, thus similarly correcting, on the third perspective image, the updated position of the second designated point 911.

According to the image processor of at least one of the above embodiments, it is possible to precisely designate, using a display image with low resolution, a point representing a position of the inside of a target displayed on the display image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the first designated point 711 (see, for example, FIG. 8) may be designated on the second display image 800, instead of being designated on the first display image 700. In this case, the position of the first corresponding point 811 is designated on the first display image 700, instead of being designated on the second display image 800. Additionally, for example, the second designated point 911 may be designated on the fourth display image 1000, instead of being designated on the third display image 900. In this case, the position of the second corresponding point 1011 is designated on the third display image 900, instead of being designated on the fourth display image 1000.

What is claimed is:

1. An image processor comprising circuitry configured to implement at least:
    a first acquirer that acquires a first perspective image of a target viewed at a first time, the first perspective image having a first resolution;
    a second acquirer that acquires a second perspective image of the target viewed at a second time different from the first time, the second perspective image having a second resolution;
    a first image generator that generates first and second display images from the first and second perspective images respectively, the first and second display images having a third resolution lower than at least one of the first and second resolutions;
    a first point acquirer that acquires a first point in the first display image and a first corresponding point in the second display image; and
    a first corrector that searches, in the second perspective image, based at least on part on pixel values in the first image and the second image, for a second image with a highest similarity to a first image in the first perspective image, the first image including the first point, and the first corrector corrects the position of the first corresponding point according to positional relation between the first and the second images.

2. The processor according to claim 1,
wherein the first corrector corrects the position of the first corresponding point in a manner that the corrected first corresponding point in the second perspective image corresponds to the position of the first point in the first perspective image.

3. The processor according to claim 1,
wherein the first corrector corrects the position of the first corresponding point at the first resolution.

4. The processor according to claim 1, wherein the first corrector searches the second image within a first region of the second perspective image, the first region including the second corresponding point, and the first corrector corrects the position of the corresponding point in the second perspective image to a position in the second perspective image, which corresponds to the position of the designated point in the first perspective image.

5. The processor according to claim 1, wherein the first point acquirer acquires the first designated point updated or the first corresponding point updated.

6. The processor according to claim 4, wherein the first point acquirer acquires the first designated point updated or the first corresponding point updated.

7. The processor according to claim 1, wherein the first image generator generates first and second comparison images from the first and second perspective images respectively, the first and second comparison images having a fourth resolution higher than the third resolution.

8. The processor according to claim 4, wherein the first image generator generates first and second comparison images from the first and second perspective images respectively, the first and second comparison images having a fourth resolution higher than the third resolution.

9. The processor according to claim 5, wherein the first image generator generates first and second comparison images from the first and second perspective images respectively, the first and second comparison images having a fourth resolution higher than the third resolution.

10. The processor according to claim 1, wherein the circuitry is further configured to implement at least:
    a third acquirer that acquires a third perspective image of the target viewed at a third time in a direction different from a direction in which the first perspective image is viewed, and the third perspective image having a fourth resolution;
    a fourth acquirer that acquires a fourth perspective image of the target viewed at a fourth time in a direction different from a direction in which the second perspective image is viewed, the fourth time being different from the third time, and the fourth perspective image having a fifth resolution;
    a second image generator that generates third and fourth display images from the third and fourth perspective images respectively, the third and fourth display images having the third resolution;
    a second point acquirer that acquires a second designated point in the third display image and a second corresponding point in the fourth display image; and
    a second corrector that searches, in the fourth perspective image, for a fourth image similar to a third image in the third perspective image, the third image including the third designated point, and the second corrector correcting the position of the second corresponding point on the fourth perspective image to a position in the fourth perspective image, which corresponds to a position that is obtained by projecting the first designated point onto the third perspective image.

11. The processor according to claim 10, wherein the second corrector corrects the position of the second corresponding point based on an epipolar line.

12. The processor according to claim 1, wherein the first acquirer acquires any one of voxel data and the first perspective image reconstructed from the voxel data.

13. The processor according to claim 8, wherein the first acquirer acquires any one of voxel data and the first perspective image reconstructed from the voxel data.

14. A treatment system comprising:
    an image processor;
    a radiographic imaging apparatus;
    a display apparatus;
    an operation device; and
    a treatment apparatus,
    wherein the image processor comprises circuitry configured to implement at least:
        a first acquirer that acquires a first perspective image of a target viewed at a first time, the first perspective image having a first resolution;
        a second acquirer that acquires a second perspective image of the target viewed at a second time different from the first time, the second perspective image having a second resolution;
        a first image generator that generates first and second display images respectively from the first and second perspective images, the first and second display images having a third resolution lower than at least one of the first and second resolutions;

a first point acquirer that acquires first and second corresponding points repectively in the first and second display images; and a first corrector that searches, in the second perspective image, based at least in part on pixel values in the first image and the second image, for a second image similar to a first image in the first perspective image, the first image including the first corresponding point, and changes, in the second perspective image, a position of the second corresponding point to a position of the second image, wherein the radiographic imaging apparatus captures the second perspective image, wherein the display apparatus displays the first and second display images at the third resolution, wherein the operation device inputs the first and second corresponding points to the first point acquirer, and wherein the treatment apparatus performs a treatment on the target based on the changed position of the second corresponding point.

15. The system according to claim 14, wherein the circuitry is further configured to implement:

a third acquirer that acquires a third perspective image of the target viewed at a third time, the third perspective image having a fourth resolution;

a fourth acquirer that acquires a fourth perspective image of the target viewed at a fourth time different from the third time, the fourth perspective image having a fifth resolution;

a second image generator that generates third and fourth display images from the third and fourth perspective images respectively, the third and fourth display images having a sixth resolution lower than at least one of the fourth and fifth resolutions;

a second point acquirer that acquires a second designated point in the third display image and a second corresponding point in the fourth display image; and a second corrector that searches, in the fourth perspective image, for a fourth image similar to a third image in the third perspective image, the third image including the third designated point, and the second corrector correcting the position of the second corresponding point in the fourth perspective image to a position in the fourth perspective image, which corresponds to the position of the designated point in the third perspective image.

16. An image processing method comprising:

acquiring a first perspective image of a target viewed at a first time, the first perspective image having a first resolution;

acquiring a second perspective image of the target viewed at a second time different from the first time, the second perspective image having a second resolution;

generating first and second display images respectively from the first and second perspective images, the first and second display images having a third resolution lower than at least one of the first and second resolutions;

acquiring first and second corresponding points respectively in the first and second display images;

searching, in the second perspective image, based at least in part on pixel values in the first image and the second image, for a second image similar to a first image in the first perspective image, the first image including the first corresponding point; and correcting, in the second perspective image, a position of the second corresponding point to a position of the second image.

17. The method according to claim 16, further comprising:

acquiring a third perspective image of the target viewed at a third time, the third perspective image having a fourth resolution;

acquiring a fourth perspective image of the target viewed at a fourth time different from the third time, the fourth perspective image having a fifth resolution;

generating third and fourth display images from the third and fourth perspective images respectively, the third and fourth display images having a sixth resolution lower than at least one of the fourth and fifth resolutions;

acquiring a second designated point in the third display image and a second corresponding point in the fourth display image;

searching, in the fourth perspective image, for a fourth image similar to a third image in the third perspective image, the third image including the third designated point; and correcting the position of the second corresponding point in the fourth perspective image to a position in the fourth perspective image, which corresponds to the position of the designated point in the third perspective image.

18. A system comprising: one or more software components tangibly embodied on one or more non-transitory processor-readable storage mediums; and one or more hardware processors configured to execute the one or more software components to cause the system to implement at least:

a first acquirer that acquires a first perspective image of a target viewed at a first time, the first perspective image having a first resolution;

a second acquirer that acquires a second perspective image of the target viewed at a second time different from the first time, the second perspective image having a second resolution;

a first image generator that generates first and second display images from the first and second perspective images respectively, the first and second display images having a third resolution lower than at least one of the first and second resolutions;

a first point acquirer that acquires a first point in the first display image and a first corresponding point in the second display image; and a first corrector that searches, in the second perspective image, based at least on part on pixel values in the first image and the second image, for a second image with a highest similarity to a first image in the first perspective image, the first image including the first point, and the first corrector correcting the position of the first corresponding point according to positional relation between the first and the second images.

19. The system according to claim 18, further comprising:

one or more memories that store the one or more software components, wherein the one or more hardware processors are further configured to at least read the one or more software components out of the one or more memories.

* * * * *